(12) United States Patent
Huang et al.

(10) Patent No.: US 11,619,523 B2
(45) Date of Patent: Apr. 4, 2023

(54) UNDERGROUND OPTICAL FIBER CABLE LOCALIZATION INCLUDING DFOS AND TDOA METHODS

(71) Applicant: NEC Laboratories America, Inc., Princeton, NJ (US)

(72) Inventors: Ming-Fang Huang, Princeton, NJ (US); Hansi Liu, North Brunswick, NJ (US); Ting Wang, West Windsor, NJ (US)

(73) Assignee: NEC Corporation

( * ) Notice: Subject to any disclaimer, the term of this patent is extended or adjusted under 35 U.S.C. 154(b) by 202 days.

(21) Appl. No.: 17/118,529

(22) Filed: Dec. 10, 2020

(65) Prior Publication Data

US 2021/0180997 A1 Jun. 17, 2021

Related U.S. Application Data

(60) Provisional application No. 63/000,524, filed on Mar. 27, 2020, provisional application No. 62/947,556, filed on Dec. 13, 2019.

(51) Int. Cl.
*G01H 9/00* (2006.01)
*G01D 5/353* (2006.01)

(52) U.S. Cl.
CPC ......... *G01D 5/35361* (2013.01); *G01H 9/004* (2013.01)

(58) Field of Classification Search
None
See application file for complete search history.

(56) References Cited

U.S. PATENT DOCUMENTS

| | | | | |
|---|---|---|---|---|
| 4,652,861 A | * | 3/1987 | Domes | G02B 6/447 324/67 |
| 5,017,873 A | * | 5/1991 | Rippingale | G01V 15/00 324/67 |
| 5,122,750 A | * | 6/1992 | Rippingale | G01V 15/00 324/345 |
| 6,194,706 B1 | * | 2/2001 | Ressl | G01V 11/00 250/225 |

* cited by examiner

*Primary Examiner* — Lisa M Caputo
*Assistant Examiner* — Nigel H Plumb
(74) *Attorney, Agent, or Firm* — Joseph Kolodka

(57) ABSTRACT

A method for the non-destructive localization of underground optical fiber cables that utilizes distributed fiber optic sensing (DFOS) and time difference of arrival (TDOA) data associated with received signals of impulsive surface vibrations to localize the underground optical fiber cable by solving non-linear least square optimization problem(s). The method utilizes only TDOA information of received signals of impulsive surface vibrations to determine such localizations and does not require synchronization between a vibration source and DFOS receiver. The method may employ man-made impulsive vibrations to determine the localization. In operation the method involves 1) impulse-like vibration excitation and signal collection; 2) TDOA estimation of the received signals from DFOS; and 3) non-linear least square optimization applied to the TDOA information for underground optical fiber localization.

10 Claims, 13 Drawing Sheets

UNDERGROUND OPTICAL FIBER CABLE LOCALIZATION INCLUDING DFOS AND TDOA METHODS

CROSS REFERENCE

This disclosure claims the benefit of U.S. Provisional Patent Application Ser. No. 62/947,556 filed Dec. 13, 2019 and U.S. Provisional Patent Application Ser. No. 63/000,524 filed Mar. 27, 2020, the entire contents of each incorporated by reference as if set forth at length herein.

TECHNICAL FIELD

This disclosure relates generally to distributed optical fiber sensing systems, methods, and structures. More particularly, it describes underground optical fiber cable localization by non-destructive methods.

BACKGROUND

Ever-increasing data demands have caused telecommunications carriers to construct large-scale optical fiber networks in an attempt to meet current and future bandwidth needs. Localizing and visualizing underground optical fiber cables is of great significance for the carriers and network providers so that the optical fiber facilities may be maintained efficiently. Usually, such maintenance relies on prior information and knowledge of cable location and orientation, which can sometimes be acquired from construction maps of sites or notes and photos that are generated during facility construction. Frequently however, such location information is inaccurate or not up-to-date. When such location knowledge is unavailable, it is challenging for carriers to locate an exact location of the optical fiber cable that requires inspection or repair. Accordingly, there exists a continuing need for systems and methods that facilitate high-precision, non-destructive localization of underground optical fiber cables.

SUMMARY

The above problems are solved and an advance in the art is made according to aspects of the present disclosure directed to the non-destructive localization of underground optical fiber cables.

In sharp contrast to prior-art methods which employ seismic or electromagnetic reflections to estimate an underground object location, systems and methods according to aspect of the present disclosure utilize distributed fiber optic sensing (DFOS) and time difference of arrival (TDOA) data associated with received signals of impulsive surface vibrations to localize the underground optical fiber cable by solving non-linear least square optimization problem(s).

Advantageously, systems and methods according to aspects of the present disclosure utilize only TDOA information of received signals of impulsive surface vibrations to determine such localizations. Of further advantage, such TDOA information does not require synchronization between a vibration source and DFOS receiver. Still further advantage, systems and methods according to aspects of the present disclosure may employ man-made impulsive vibrations to determine the localization.

BRIEF DESCRIPTION OF THE DRAWING

A more complete understanding of the present disclosure may be realized by reference to the accompanying drawing in which.

Figure 1:
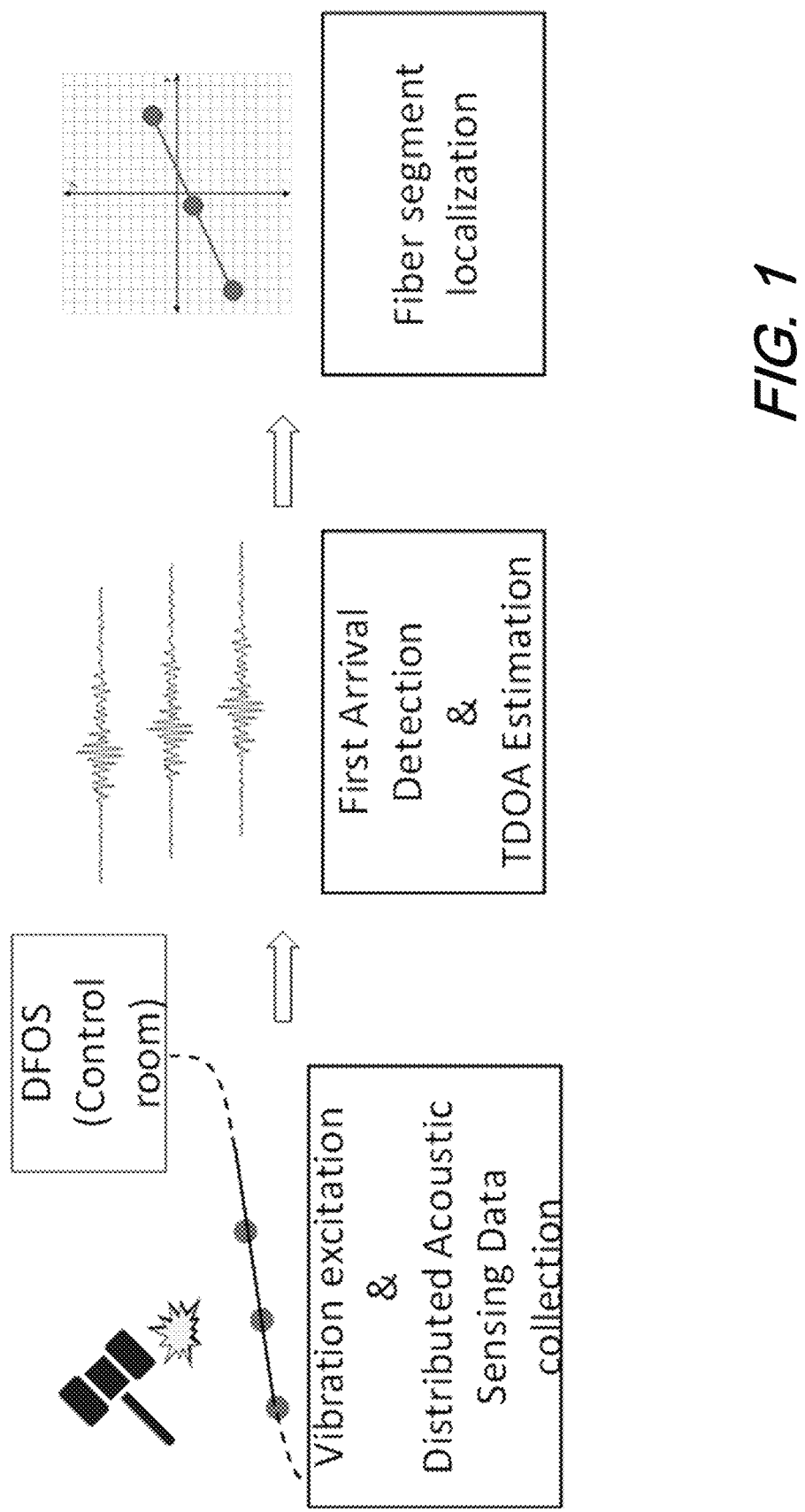
FIG. 1 is a flow diagram illustrating non-destructive optical fiber cable localization according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

FIG. 1 shows a schematic flow chart diagram of an illustrative method for non-destructive localization of an optical fiber cable according to aspects of the present disclosure. As may be observed from that diagram, an illustrative method generally includes three (3) aspects namely, 1) Data acquisition—impulse-like vibration excitation and distributed acoustic sensing signal data collection;

(2) TDOA estimation—first arrival signal detection and TDOA estimation of received signals from DFOS; and (3) Localization—fiber segment localization employing novel method for non-linear least square optimization applied to the TDOA information for underground optical fiber cable segment localization.

With continued reference to that figure, those three aspects may be more fully understood. In the data acquisition aspect, a DFOS system—generally positioned within a central office and in optical communication with a field-deployed underground optical fiber cable whose position/location may be largely unknown. As will be appreciated by those skilled in the art, the DFOS system provides optical pulse(s) to the optical fiber and receives scattered light therefrom. By detecting relative phase shift(s) of the reflected coherent Rayleigh scattered light, environmental vibration data may be acquired by the DFOS system and information derived therefrom. During the data acquisition process, a sequence of impulsive vibrations is excited at different places in the suspected/known vicinity of the optical fiber and vibration signals captured by multiple points along the optical fiber segments with fixed consecutive spacing are recorded under synchronization by the DFOS system.

With respect to TDOA estimation, for each impulsive vibration, TDOA information of received signals at multiple points along the fiber is determined by signal processing and comparing the estimated first signal arrival timestamps.

Figure 2A:
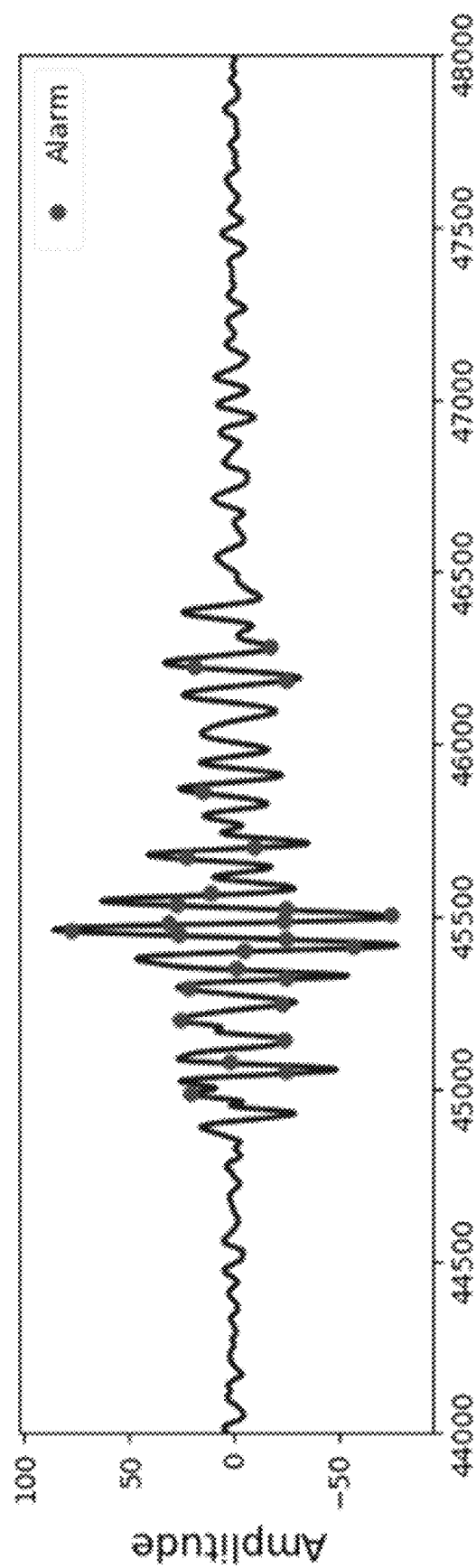
FIG. 2(A), FIG. 2(B), and FIG. 2(C) are a series of plots showing examples of received signals and detected signal anomaly according to aspects of the present disclosure.
Figure 2B:
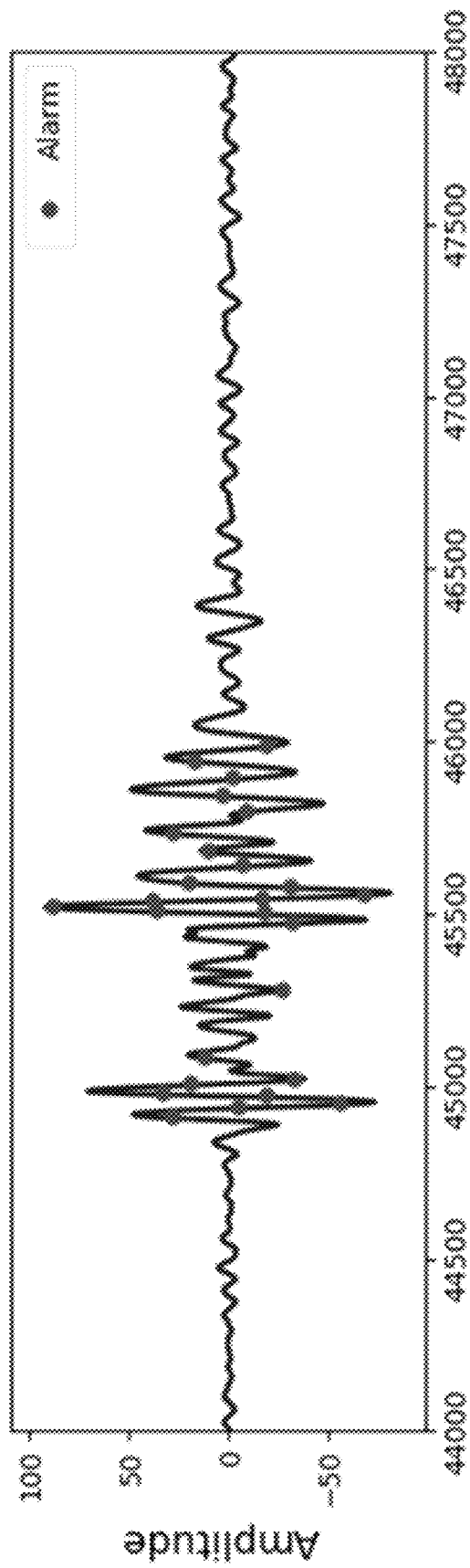
Figure 2C:
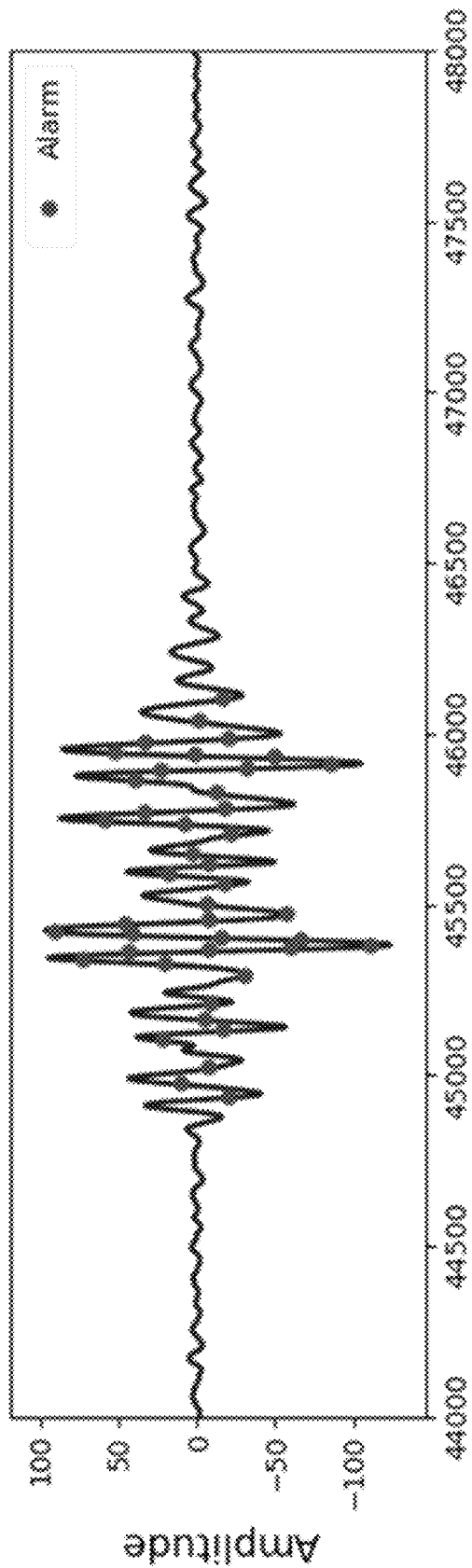

FIG. 2(A), FIG. 2(B), and FIG. 2(C) Shows the received signal and the detected anomaly from 3 consecutive points on the fiber segment. For each signal, the first anomaly shown in red dot is regarded as first arrival time. Relative TDOA is then obtained from the differences of first arrivals.

Figure 3:
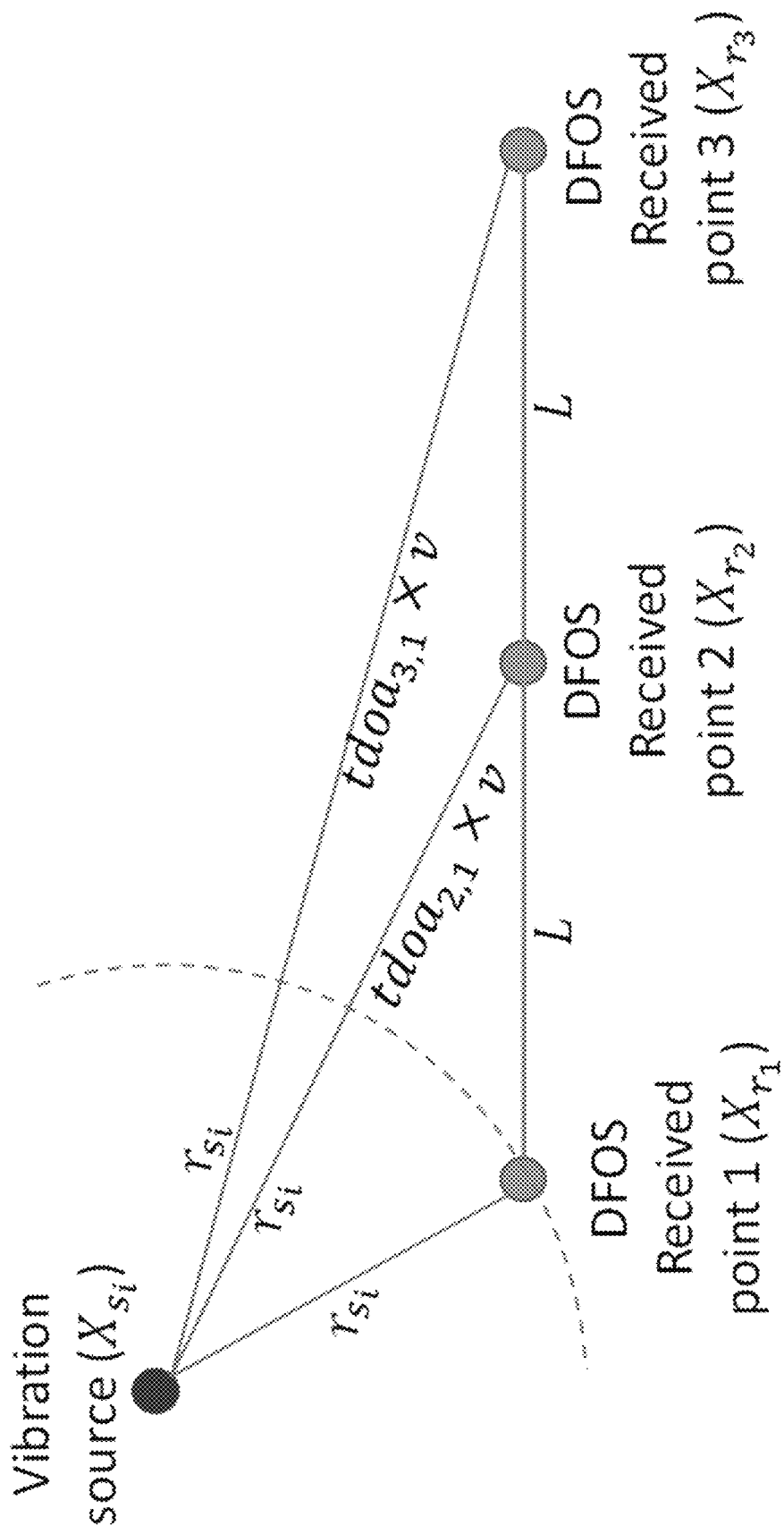
FIG. 3 is a schematic diagram illustrating a top-down view of an experimental configuration according to aspects of the present disclosure.

Finally, to perform localization utilizing TDOA information to estimate the position(s) of fiber segment(s) of interest, the geometry in FIG. 3 is employed. As may be observed, FIG. 3 is a schematic diagram illustrating a top-down view of an experimental configuration according to aspects of the present disclosure.

With reference to that figure, it may be observed that the coordinates of a vibration source is denoted as $X_{s_1}$, and the coordinates of 3 consecutive received points are denoted as $X_{r_1}$, $X_{r_2}$, $X_{r_3}$ respectively, where $X_{s_1}$ is known and $X_{r_1}$, $X_{r_2}$, $X_{r_3}$ are unknowns that determine a 2D location of the fiber segment of interest. Assuming that most of the vibration energy arrives at received points through direct paths, the following systems of equations can be obtained:

$$\begin{cases} r_{s_i} - \|X_{s_1} - X_{r_1}\|_2 = 0 \\ r_{s_i} + tdoa_{i_{2,1}} \times v - \|X_{s_1} - X_{r_2}\|_2 = 0 \\ r_{s_i} + tdoa_{i_{3,1}} \times v - \|X_{s_1} - X_{r_3}\|_2 = 0 \end{cases} \quad (1)$$

where $s_i$ is the vibration source index and $r_{s_i}$ denotes the vibration's transmission path from source $s_i$ to received point 1. $tdoa_{i_{k,1}}$ denotes the time difference of arrival between received signals of receiver point k and 1. v represents the vibration propagation speed in the vicinity of the fiber segment. Notice that the underground signal propagation speed is an unknown variable. One assumption has been made as it is constant in the vicinity of the fiber segment. Considering that most of the time the structure of the underground fiber is a line segment, and the received points are co-linear, the following system of equations is obtained:

$$\begin{cases} \|X_{r_1} - X_{r_2}\|_2 = L \\ \|X_{r_2} - X_{r_3}\|_2 = L \\ \|X_{r_1} - X_{r_3}\|_2 = 2L \end{cases} \quad (2)$$

Based on equation (1) and equation (2), a system of residuals is defined by replacing the zeros in (1) with error terms as following:

$$\begin{cases} r_{s_i} - \|X_{s_1} - X_{r_1}\|_2 = e_{i,1} \\ r_{s_i} + tdoa_{i_{2,1}} \times v - \|X_{s_1} - X_{r_2}\|_2 = e_{i,2} \\ r_{s_i} + tdoa_{i_{3,1}} \times v - \|X_{s_1} - X_{r_3}\|_2 = e_{i,3} \end{cases} \quad (3)$$

where $e_{i,j}$ denotes the error between the source-receiver distance and actual signal transmission range. To make (3) identical as (1), all of the error terms should be as close to zero as possible. In this manner, a non-linear least square optimization problem with non-linear constraint is formulated as following:

$$\min_{X_{r_1}, X_{r_2}, X_{r_3}} \sum_i^M \sum_j^N e_{i,j}^2 \quad (4)$$

$$s.t. \begin{cases} \|X_{r_1} - X_{r_2}\|_2 = L \\ \|X_{r_2} - X_{r_3}\|_2 = L \\ \|X_{r_1} - X_{r_3}\|_2 = 2L \end{cases}$$

where M is the number of vibration sources and N is the number of received points on the fiber segment. Based on the above optimization, the locations of the received points can be estimated, thus determine the location of the underground fiber segment.

Figure 4:
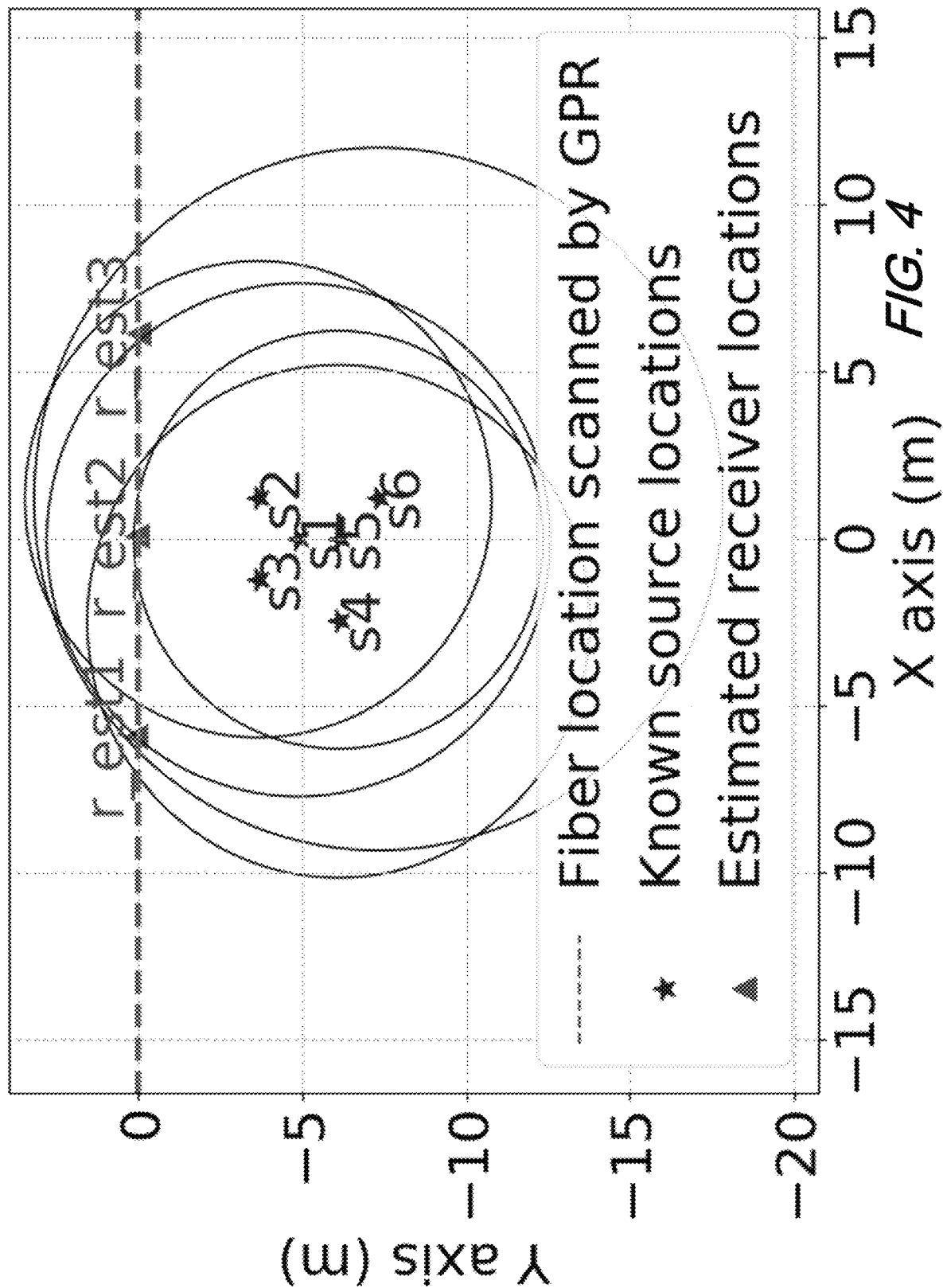
FIG. 4 is plot showing an example localization result according to aspects of the present disclosure.

FIG. 4 is plot showing an example localization result from a field test according to aspects of the present disclosure. As may be observed from that figure, after several excitations around the unknown fiber (blue stars) and applying the above algorithm, the estimated fiber receiver locations (shown in purple triangles) reflects the linear structure of the ground truth fiber position (shown in blue dashed line) within sub-meter-level error.

As previously noted, one aspect of this disclosure describes the use of optical fiber sensing technologies and vibration sources to identify underground cable positions. We note that due to underground attenuation, the intensity of the vibration as well as the cut-off frequency of received signals reduce as the vibration source is located farther away from the optical fiber cable.

Using this general principle, we advantageously determine the position and orientation of an underground optical fiber cable by examining the intensity and cut-off frequency of a received signal after performing an inventive cross-fiber scan.

Advantageously—according to aspect of the present disclosure—the received signal with the maximum received intensity and cut-off frequency indicates the fiber's position and orientation. Of further advantage according to aspects of the present disclosure, our inventive system and method may also identify the underground environment in which the optical fiber cable is located, using the intensity-frequency pattern of the received signal from multiple points in a vibration scan.

Figure 5:
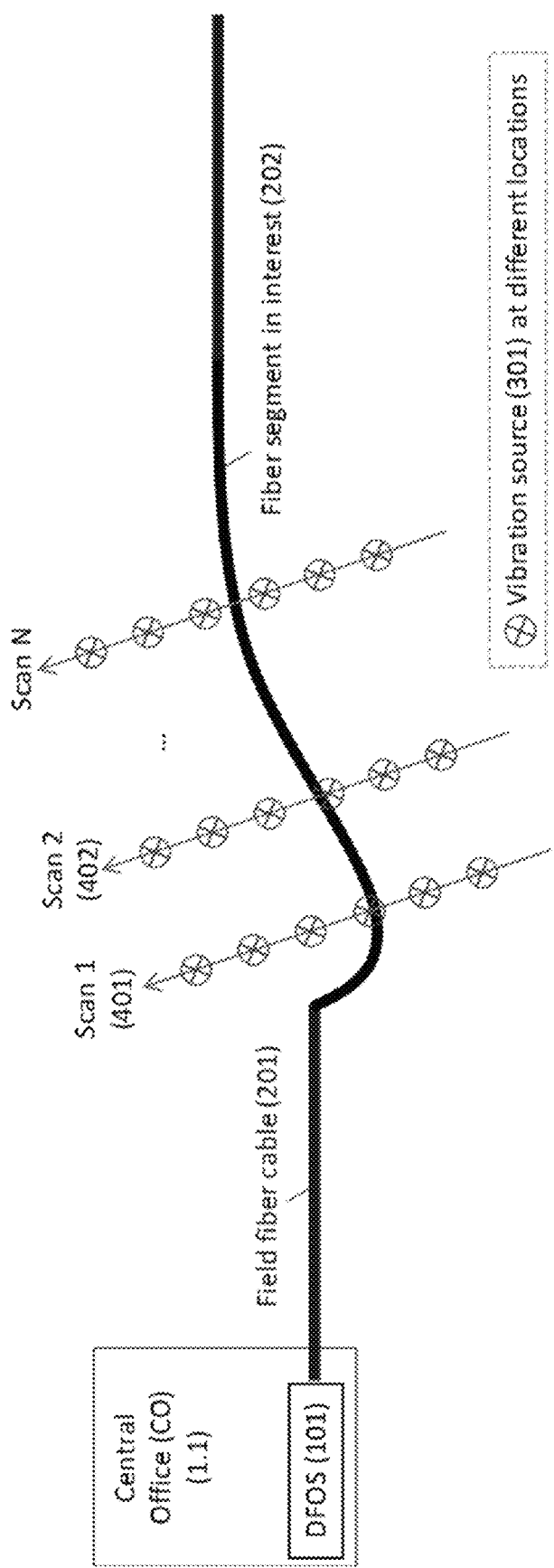
FIG. 5 is schematic diagram illustrating a system configuration and cross-fiber scan pattern according to aspects of the present disclosure.

FIG. 5 is schematic diagram illustrating a system configuration and cross-fiber scan pattern according to aspects of the present disclosure. As may be observed from that figure, a distributed fiber optical sensing (DFOS) system is shown positioned in a central office (CO). As will be appreciated by those skilled in the art, technologies employed such an illustrative architecture may be distributed vibration sensing (DVS) or distributed acoustic sensing (DAS) using optical fiber cable.

In the field—generally outdoors—a fiber segment of interest is buried in an unknown location and/or position. According to an aspect of the present disclosure, an inventive cross-fiber scanning scheme is employed to determine the location and/or position. Each (cross-fiber) scan is performed by exciting point vibration using certain controlled vibration sources which advantageously can be vibration or acoustic signals along a scan line at a fixed spacing.

The scan lines start from one side of the fiber's potential location and end at the other side with some extra marginal distances to ensure the scan to cross the fiber. It is worth mentioning here that the scan lines don't have to be parallel to each other nor perpendicular to the fiber's orientation.

Figure 6:
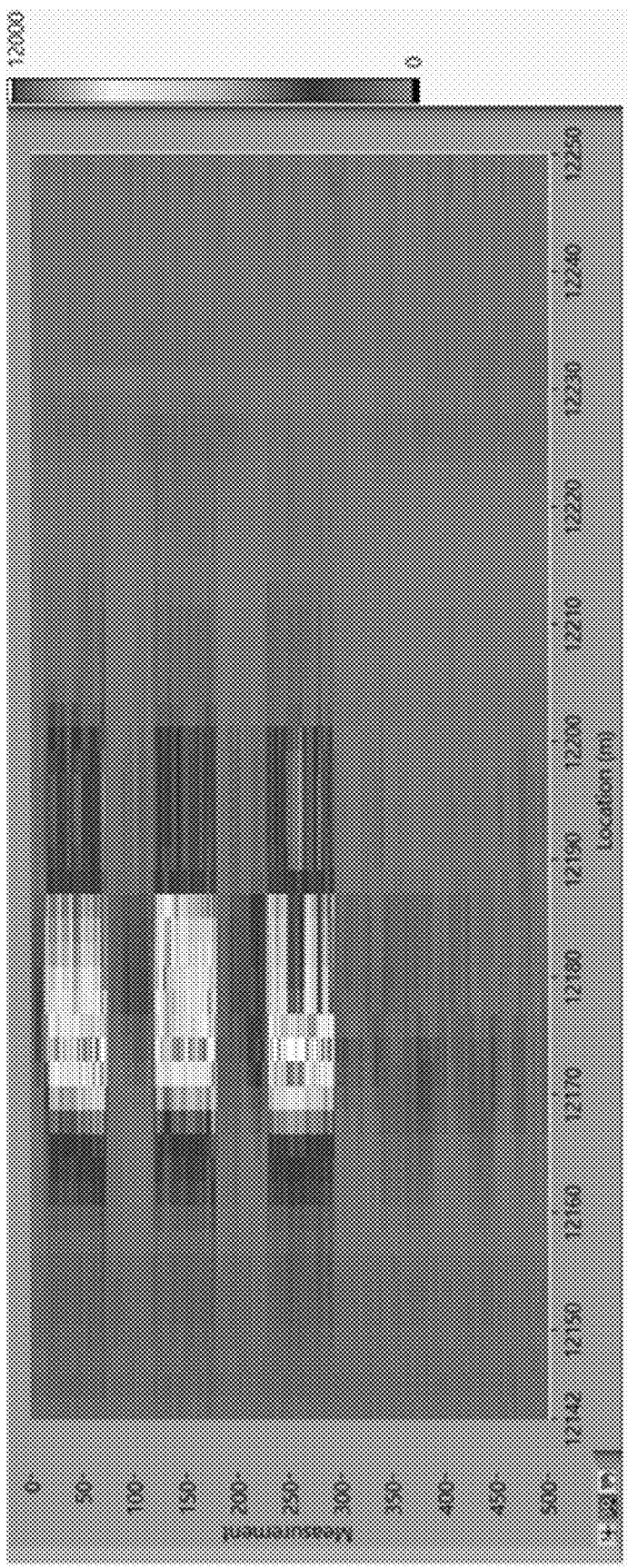
FIG. 6 is plot showing a waterfall trace obtained by DFOS indicating ambient vibration signatures resulting from a vibration source applied to ground surface according to aspects of the present disclosure.
Figure 7A:
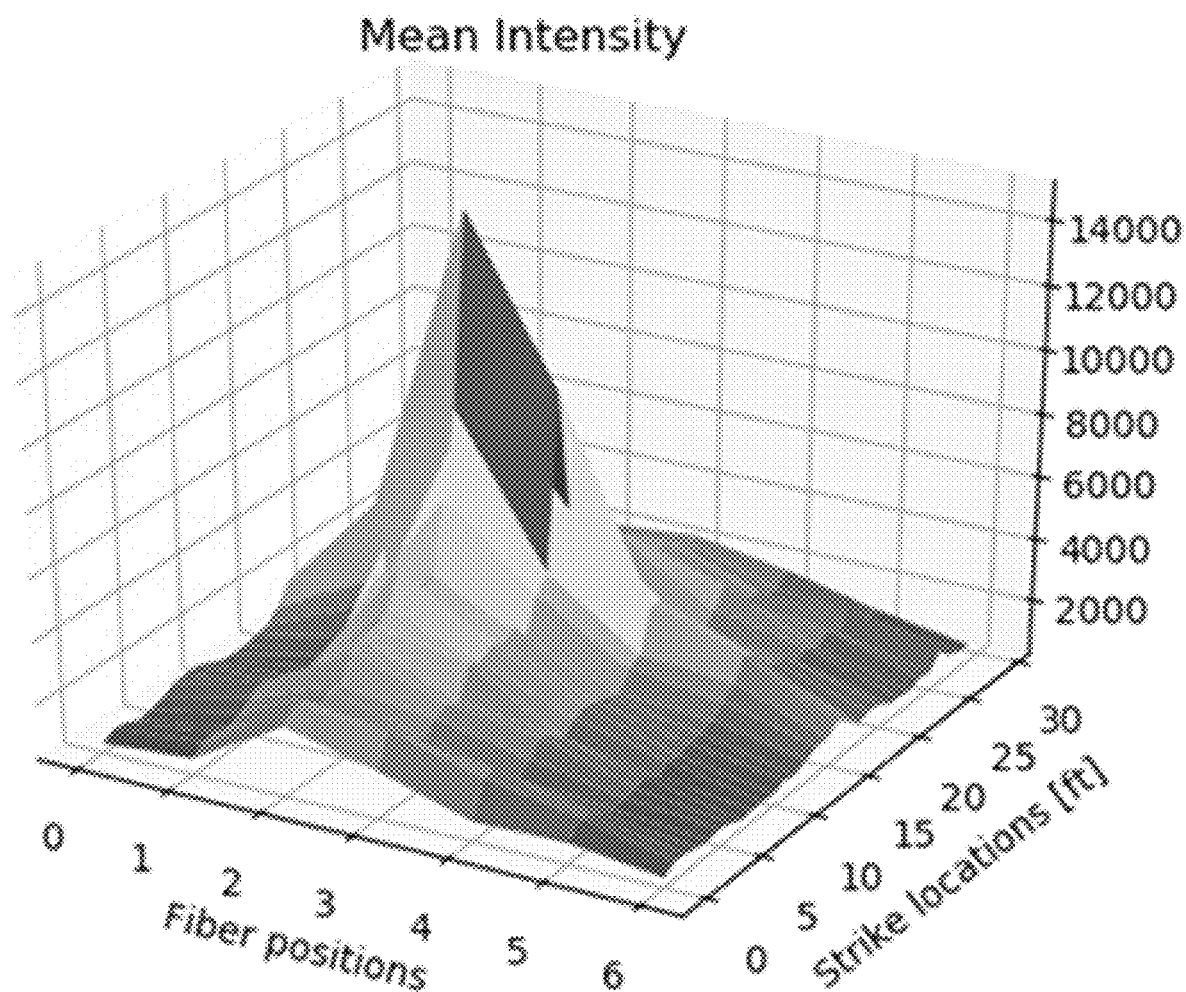
FIG. 7(A), FIG. 7(B), FIG. 7(C), and FIG. 7(D) are plots illustrating average intensity as a function of vibration source location and sensing points along fiber optic cable according to aspects of the present disclosure.
Figure 7B:
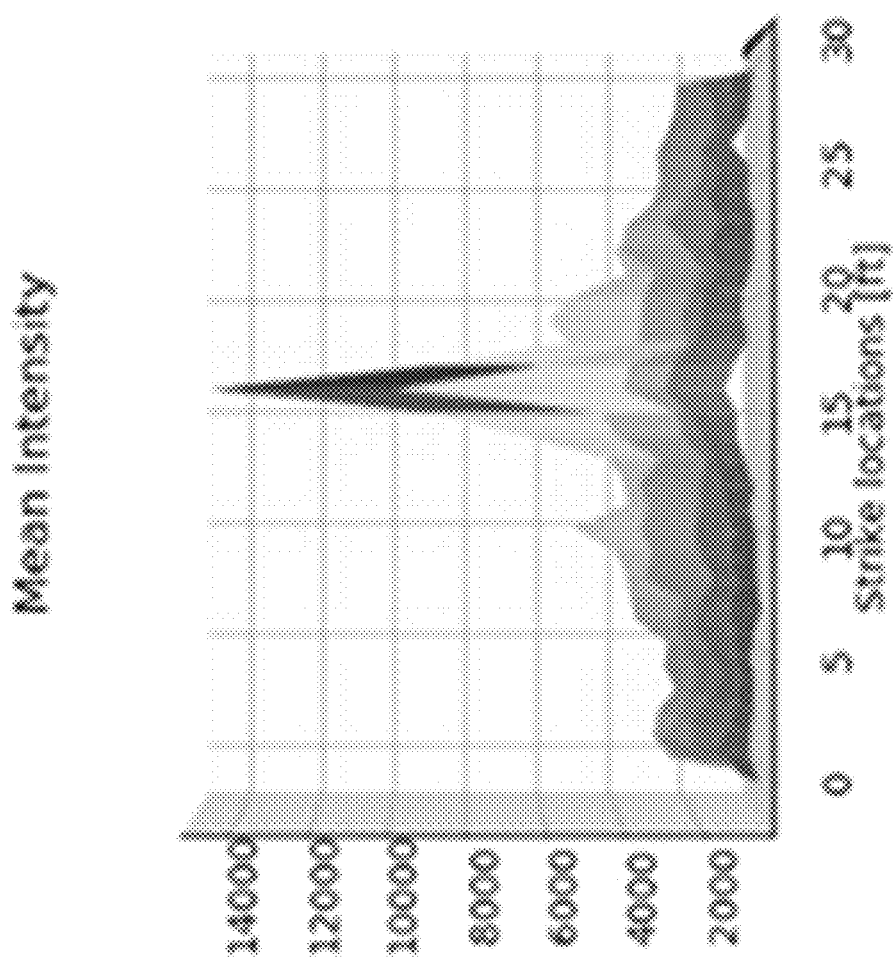
Figure 7C:
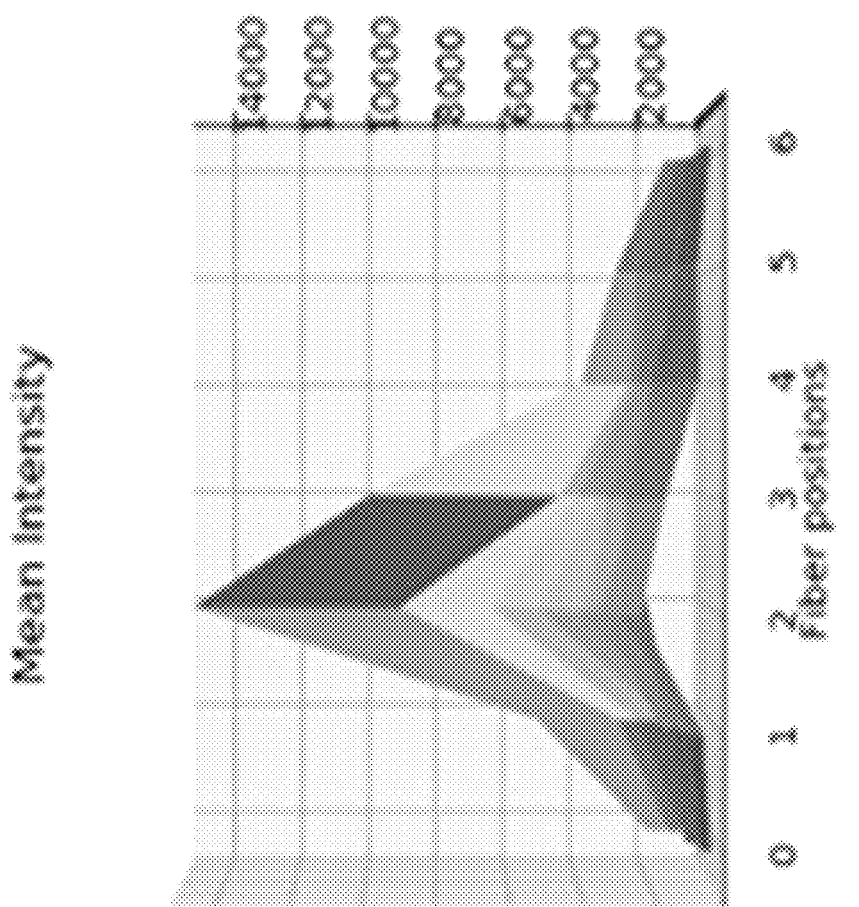
Figure 7D:
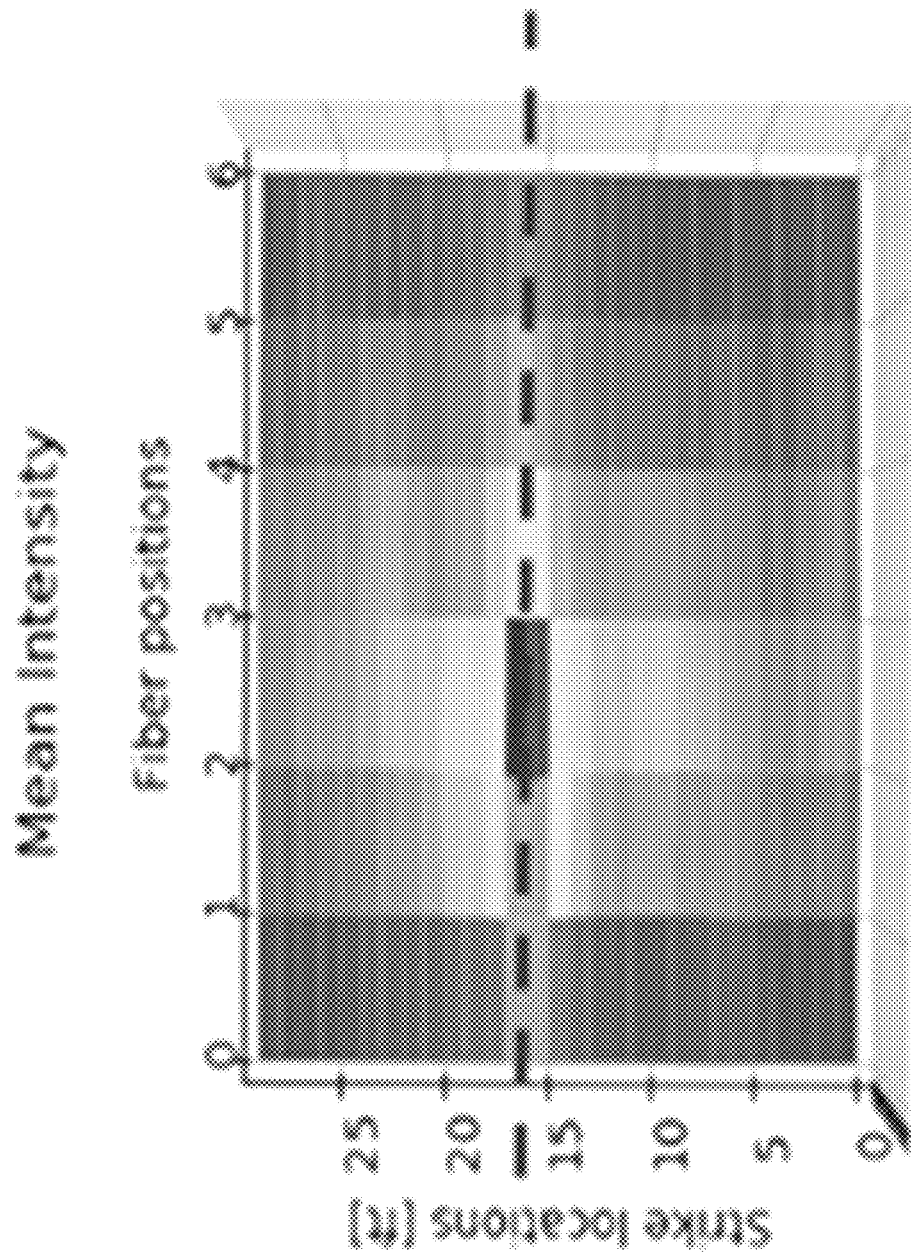

FIG. 6 is plot showing a waterfall trace obtained by DFOS indicating ambient vibration signatures resulting from a vibration source applied to ground surface according to aspects of the present disclosure.

As a result of performing a scan by exciting vibration at different positions along a scan line, certain areas of the fiber optic cable will "pick up" the vibration energy. As may be observed in FIG. 6, an illustrative example is shown of received signal intensity when three consecutive vibration signals are applied to the ground surface. We can see that a point vibration source results to the response of a segment, rather than a point, of the fiber with non-uniform intensity distribution. Moreover, when the vibration source is getting closer to the fiber, as we are crossing the fiber, the average intensity along the fiber segment also changes.

FIG. 7(A), FIG. 7(B), FIG. 7(C), and FIG. 7(D) are plots illustrating average intensity as a function of vibration source location and sensing points along fiber optic cable according to aspects of the present disclosure. These figures illustrate the average intensity changing when vibration source is proximal to the fiber phenomenon by showing the averaged intensity as a function of both vibration position as well as cable positions along a segment of the fiber cable for one scan. We observe that the maximum intensity appears at strike location of 15 feet, FIG. 7(B), which indicates that the fiber is most likely beneath it. We also observe that fiber position #2 always has the maximum energy, FIG. 3(A) and FIG. 3(C), which indicates that it is fiber position 2 that is right under the vibration source at around 16 feet. We can roughly estimate the structure of part of the fiber segment by finding the maximum average intensity for each scan point and fit a line through these local maximum points to represent the potential fiber structure, as the dashed line on FIG. 3(D) shows. By further referring to the scan position information logged using GPS and DFOS, we may determining the fiber cable segment's position as well as its orientation. With multiple scans in the field region of interest, we are able to determine the positions of larger sections of the cable and generate a visualization of the underground cable structure.

In addition to intensity, the cut-off frequency or bandwidth of the received signal can also reveal fiber's position. Since high frequency components of the vibration attenuate faster than low frequency components, it is anticipated that the further the vibration source is, the smaller the cut-off frequency (the narrower the bandwidth) becomes.

Figure 8:
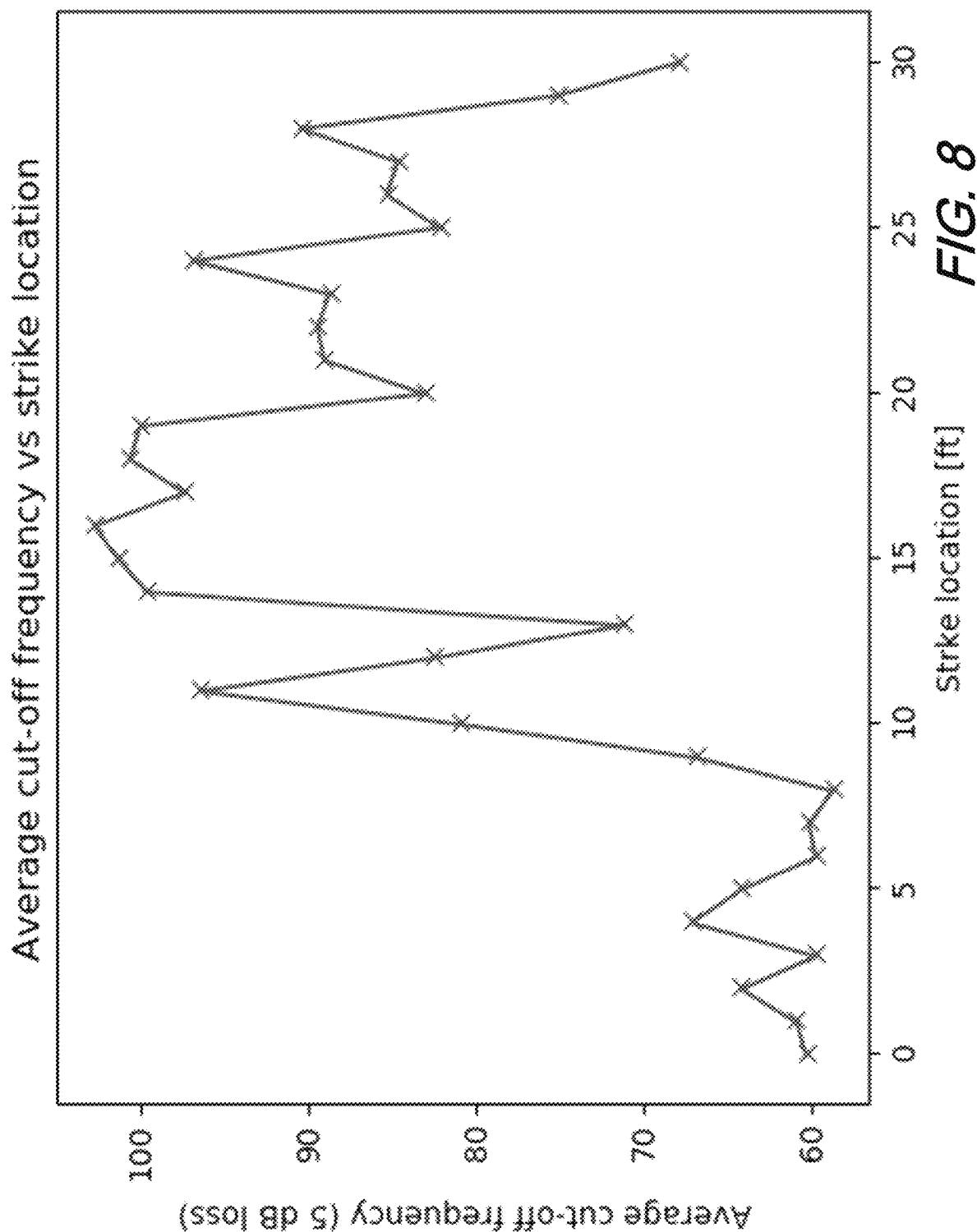
FIG. 8 is a plot showing cut-off frequency of a received signal as a function of vibration source position(s) according to aspects of the present disclosure.

FIG. 8 is a plot showing cut-off frequency of a received signal as a function of vibration source position(s) according to aspects of the present disclosure. We notice that the maximum cut-off frequency of the received signal appears when the vibration is excited at around 16 feet. This indicates the position where the fiber is closest to the vibration source and less high frequency components are attenuated, which is consistent with the results inferred from intensity such as that in FIGS. 7(A)-7(D)).

The above methodology applies well to the cases in which the fiber cable is directly buried under uniform and homogeneous soil. For the situations where cables are installed in manhole or conduit, the surrounding environment of the cable becomes more complex, and the corresponding intensity distribution and cut-off frequency plot result from the scan will be different. We can also exploit these differences to identify soil type or surrounding environment.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for the non-destructive localization of underground fiber optic cable using distributed fiber optic sensing (DFOS) and time difference of arrival (TDOA), the method comprising:
   providing vibration excitation to fiber optic cable and receiving Rayleigh backscattered signals from the fiber optic cable;
   performing a time difference of arrival (TDOA) analysis on the received signals such that TDOA information is generated;
   determining the localization of the underground fiber optic cable from the TDOA information via non-linear least square optimization;
   an optical interrogator unit that generates optical pulses, introduces them into the optical fiber, and receives Rayleigh backscattered signals from the fiber; and
   a data processor unit that is configured to:
      determine from the backscattered signals, mechanical vibrations experienced by the optical fiber along its length resulting from a vehicle operating on the highway; and
      determine characteristics of the vehicle that produced the determined mechanical vibrations.

2. The method of claim 1 wherein the exact location of the underground fiber optic cable is unknown at the time of excitation.

3. The method of claim 2 wherein the vibration excitation is provided at different geographic locations such that the excitation is performed at multiple points on the fiber optic cable.

4. The method of claim 3 wherein the vibration excitation is performed at multiple points on fiber segments having fixed consecutive spacing along the fiber.

5. The method of claim 4 wherein for each vibration excitation impulse, the TDOA information of the received signals is determined by comparing estimated first signal arrival timestamps.

6. The method of claim 5 wherein the excitation is performed by a vibration source $X_{s_1}$, and coordinates of 3 consecutive points $X_{r_1}, X_{r_2}, X_{r_3}$, where $X_{s_1}$ is known and $X_{r_1}, X_{r_2}, X_{r_3}$ are unknowns that determine a 2D location of the fiber optic cable segment, and the locations are determined according to the following relationships:

$$\min_{X_{r_1},X_{r_2},X_{r_3}} \sum_i^M \sum_j^N e_{i,j}^2$$

$$\text{s.t.} \begin{cases} \|X_{r_1} - X_{r_2}\|_2 = L \\ \|X_{r_2} - X_{r_3}\|_2 = L \\ \|X_{r_1} - X_{r_3}\|_2 = 2L \end{cases}$$

7. A non-destructive localization method for underground fiber optic cable comprising:
   generating optical pulses and introducing them into the fiber optic cable;
   providing vibration excitation to one or more segments of the fiber optic cable in a cross-fiber scanning pattern;
   receiving Rayleigh backscattered signals from the fiber optic cable;
   performing a time difference of arrival (TDOA) analysis on the received signals such that TDOA information is generated;
   determining the localization of the underground fiber optic cable segment(s) from the TDOA information.

8. The method of claim 7 wherein the vibration excitation are performed according to a plurality of scan lines at a fixed spacing, said scan lines originating from one side of the fiber optic cable segment(s) geographic location to another side of the fiber optic cable segment(s) geographic location such that the scan is performed across the fiber optic.

9. The method of claim 8 wherein said scan lines are not parallel to one another.

10. The method of claim 8 wherein scan lines are not perpendicular to the fiber optic cable.

* * * * *